(12) United States Patent
Oki et al.

(10) Patent No.: US 6,731,457 B2
(45) Date of Patent: May 4, 2004

(54) THIN-FILM MAGNETIC HEAD SUITABLE FOR NARROW TRACKS

(75) Inventors: Naruaki Oki, Niigata-ken (JP); Takashi Arai, Niigata-ken (JP); Sumihito Morita, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 134 days.

(21) Appl. No.: 09/754,518

(22) Filed: Jan. 4, 2001

(65) Prior Publication Data
US 2001/0008474 A1 Jul. 19, 2001

(30) Foreign Application Priority Data
Jan. 14, 2000 (JP) .......................... 2000-005595

(51) Int. Cl.[7] .............................................. G11B 5/147
(52) U.S. Cl. ...................................................... 360/126
(58) Field of Search ............................. 360/126, 264.8, 360/265.5, 265.8, 317–318

(56) References Cited

U.S. PATENT DOCUMENTS

| | | | | |
|---|---|---|---|---|
| 3,634,933 A | * | 1/1972 | Hanak | 29/603.11 |
| 3,735,052 A | * | 5/1973 | Hoogendoorn et al. | 360/122 |
| 4,896,417 A | * | 1/1990 | Sawada et al. | 29/603.14 |
| 5,559,653 A | * | 9/1996 | Shouji et al. | 360/126 |
| 5,609,971 A | * | 3/1997 | Matono et al. | 428/692 |
| 5,793,578 A | | 8/1998 | Heim et al. | |
| 5,793,579 A | * | 8/1998 | Yamamoto et al. | 360/126 |
| 5,798,897 A | | 8/1998 | Chang et al. | |
| 5,936,814 A | * | 8/1999 | Slade et al. | 360/126 |
| 6,012,218 A | * | 1/2000 | Shimizu et al. | 29/603.14 |
| 6,042,897 A | * | 3/2000 | Watanabe et al. | 427/534 |
| 6,067,703 A | * | 5/2000 | Takahashi et al. | 29/603.13 |
| 6,261,468 B1 | * | 7/2001 | Sato et al. | 216/22 |
| 6,456,459 B1 | * | 9/2002 | Sasaki | 360/126 |
| 6,524,491 B1 | * | 2/2003 | Liu et al. | 216/22 |

FOREIGN PATENT DOCUMENTS

| | | |
|---|---|---|
| JP | 08-339508 | 12/1996 |
| JP | 10-143817 | 5/1998 |
| JP | 11-353616 | 12/1999 |
| JP | 2001-76320 A | 3/2001 |

* cited by examiner

Primary Examiner—A. J. Heinz
(74) Attorney, Agent, or Firm—Brinks Hofer Gilson & Lione

(57) ABSTRACT

In a thin-film magnetic head, an lower magnetic pole layer is formed on a lower core layer to form a step between the lower core layer and the lower magnetic pole layer. A coil layer and a coil-insulating layer are formed on the lower core layer, and an upper core layer is formed over the lower magnetic pole layer and the coil-insulating layer. This configuration decreases the height of the coil-insulating layer from the lower magnetic pole layer compared to the height in a conventional thin-film magnetic head. The front end of the upper core layer can be precisely formed so as to have a track width Tw. This thin-film magnetic head is suitable for narrower track widths.

12 Claims, 11 Drawing Sheets

FACE OPPOSING A RECORDING HEAD

THIN-FILM MAGNETIC HEAD SUITABLE FOR NARROW TRACKS

BACKGROUND OF THE INVENTION

1. Field of the Invention

The present invention relates to a thin-film magnetic head having a coil layer provided between core layers. In particular, the present invention relates to a thin-film magnetic head suitable for narrower track widths and to a method for making the thin-film magnetic head in which the front end of the upper core layer can be precisely formed so as to have a track width Tw.

2. Description of the Related Art

FIG. 24 is a longitudinal cross-sectional view showing a structure of a conventional thin-film magnetic head. This thin-film magnetic head is an inductive write head and is mounted at the trailing end of a slider of a floating magnetic head which opposes recording media such as hard disks.

The thin-film magnetic head has a lower core layer 1 composed of a magnetic material such as a NiFe alloy. A gap layer 3 composed of a nonmagnetic material, such as alumina ($Al_2O_3$) or $SiO_2$, is formed on the lower core layer 1. Furthermore, an insulating layer 7 composed of an organic material such as a resist material is formed on the gap layer 3.

A spiral coil layer 4 composed of a conductive material having low electrical resistance such as copper is formed on the insulating layer 7. The coil layer 4 is provided so as to surround a base end 6b of an upper core layer 6, although only part of the coil layer 4 is depicted in FIG. 24. The coil layer 4 is covered with a coil-insulating layer 5 composed of an organic material or the like. The upper core layer 6 is formed on the coil-insulating layer 5 by plating a magnetic material such as Permalloy. A front end 6a of the upper core layer 6 is jointed to the lower core layer 1 with the gap layer 3 provided therebetween at a face opposing a recording medium to define a magnetic gap having a gap length Gl. The base end 6b of the upper core layer 6 is magnetically coupled with the lower core layer 1 via a hole formed in the gap layer 3.

The width of the front end 6a of the upper core layer 6 in the track width direction (X direction in the drawing) defines a track width Tw. Trends toward recent high-density recording require the formation of a smaller track width Tw.

In the inductive write head, a recording current applied to the coil layer 4 induces a recording magnetic field to the lower core layer 1 and the upper core layer 6. A leakage magnetic field from the magnetic gap portion between the lower core layer 1 and the front end 6a of the upper core layer 6 is recorded on a recording medium such as a hard disk as a magnetic signal.

The upper core layer 6 of the thin-film magnetic head is formed by a frame plating process. FIG. 25 shows a step for forming the upper core layer 6. The gap layer 3 is formed on the lower core layer 1, and the insulating layer 7 is formed on the gap layer 3 with a predetermined gap depth T1 in the height direction (Y direction in the drawing) from the face opposing a recording medium. Next, the coil layer 4 is formed on the insulating layer 7. After the coil layer 4 is covered by the coil-insulating layer 5, a plating underlayer 9 composed of a magnetic material such as a NiFe alloy is formed over the exposed front portion of the gap layer 3 and the coil-insulating layer 5.

A resist layer 8 is formed on the plating underlayer 9 and is exposed and developed to form a pattern of the upper core layer 6 on the resist layer 8. A magnetic layer is formed by plating on the exposed plating underlayer 9 and the remaining resist layer 8 is removed. The upper core layer 6 shown in FIG. 24 is thereby completed.

In the above conventional thin-film magnetic head, the formation of the upper core layer 6 has the following problems.

As shown in FIG. 25, a protrusion having a height H3 from the surface of the gap layer 3 is formed by depositing the insulating layer 7, the coil layer 4, and the coil-insulating layer 5 on the lower core layer 1. When the resist layer 8 is coated on the plating underlayer 9, the thickness H1 of the resist layer 8 is significantly large on the front portion of the lower core layer 1. Moreover, the thickness of the resist layer 8 is not uniform.

Thus, focusing in the exposure and develop step of the resist layer 8 is difficult, and thus, a precise pattern of the upper core layer 6 cannot be formed in the resist layer 8. Accordingly, the uneven thickness causes a decrease in precision of the patterning.

The front end 6a of the upper core layer 6 is defined by the track width Tw as described above. To satisfy future trends towards high-density recording, the track width Tw must be smaller. Since the thickness H1 of the resist layer 8 is significantly large at a portion to form the front end 6a of the upper core layer 6, a large focal depth is required in the exposure and develop step to form a pattern in the resist layer 8 having the thickness H1. Such a large focal depth requires light having a shorter wavelength in the exposure and develop step. The light having the shorter wavelength causes a decrease in resolution and the width of the front end 6a of the resulting upper core layer 6 is inevitably larger than the track width Tw.

Since the thickness of the resist layer 8 is not uniform due to the protrusion formed by the coil-insulating layer 5, the insulating layer 7, and the coil layer 4 on the lower core layer 1, irregular reflection readily occurs in the exposure and develop step. Thus, the pattern formed in the resist layer 8 is distorted. As a result, the front end 6a of the upper core layer 6 cannot have the track width Tw.

SUMMARY OF THE INVENTION

It is an object of the present invention to provide a thin-film magnetic head which has a front end, defined by the track width Tw, of an upper core layer and can be used for narrower tracks.

It is another object of the present invention to provide a method for making the same.

An aspect of the present invention relates to a thin-film magnetic head comprising a lower core layer; a lower magnetic pole layer formed independently of or integrally with the lower core layer; a nonmagnetic gap layer extending from a face opposing a recording medium on the lower magnetic pole layer; an upper core layer in contact with the upper face of the gap layer; and a coil layer lying behind the lower magnetic pole layer in the height direction, the coil layer being covered with a coil-insulating layer and inducing a recording magnetic field in the lower core layer and the upper core layer; wherein the upper core layer in contact with the gap layer has a track width Tw at an exposed face opposing a recording medium, and the upper core layer extends on the coil-insulating layer.

This configuration reduces the protrusion of the surface for forming the upper core layer compared to conventional configurations, and precisely forms the front end with the track width Tw of the upper core layer within a predetermined range. Since the lower magnetic pole layer is formed on the lower core layer, the coil layer is formed on the lower core layer which is indented from the surface of the lower magnetic pole layer. The upper core layer is formed over the lower magnetic pole layer and the coil-insulating layer covering the coil layer. Thus, the protrusion of the coil-insulating layer is determined based on the surface of the gap layer formed on the lower magnetic pole layer.

In contrast, a lower magnetic pole layer is not formed on a lower core layer in conventional configurations. Thus, the protrusion of the coil-insulating layer is determined based on the gap layer formed on the lower core layer.

Accordingly, the protrusion of the coil-insulating layer in the present invention can be reduced by a the thickness of the lower magnetic pole layer formed at least on the lower core layer. As a result, the thickness of a resist layer used in the formation of the upper core layer can be reduced in the vicinity of the front end having a track width Tw. Moreover, the resist layer can be more uniformly formed over the entire region compared to the conventional configurations, improving resolution and reducing irregular reflection. The front end of the upper core layer is thereby formed precisely within a predetermined track width Tw.

Preferably, the gap layer has the track width Tw, and the lower magnetic pole layer has the track width Tw at a position in contact with the gap layer. In a preferred embodiment of this configuration, the lower magnetic pole layer is formed independently of the lower core layer and has a base portion and a protruding portion extending toward the upper core layer, the width of the protruding portion is smaller than that of the base portion, and the upper face of the protruding portion is in contact with the gap layer. Preferably, the lower magnetic pole layer has sloping faces extending from the bottom corners of the protruding portion toward directions departing from the upper core layer at both sides in the track width direction. In addition, the lower core layer may have sloping upper faces continuing from the sloping faces of the lower magnetic pole layer.

Alternatively, the lower magnetic pole layer may be formed independently of the lower core layer and may be rectangular or trapezoidal in which the width of the bottom in contact with the lower core layer is larger than the width at the top in contact with the gap layer, and the lower core layer may have a protruding portion having sloping upper faces continuing from the sloping faces of the lower magnetic pole layer. Preferably, the upper face of the lower core layer has sloping faces extending from the bottom corners of the protruding portion so as to depart from the upper core layer in the track width direction.

Alternatively, the lower magnetic pole layer may be integrally formed with the lower core layer and protrudes from the lower core layer. In such a case, preferably, the lower core layer has sloping upper faces extending from the bottom corners of the protruding lower magnetic pole layer toward directions departing from the upper core layer at both sides in the track width direction.

The protruding portion and the sloping faces of the lower magnetic pole layer and the protruding portion and the sloping faces of the lower core layer can adequately reduce write fringing.

In the present invention, the lower magnetic pole layer may be formed integrally with the lower core layer.

The gap layer may extend over the lower magnetic pole layer and the lower core layer behind the lower magnetic pole layer in the height direction.

The gap layer formed on the lower core layer may function as an insulating layer between the coil layer and the lower core layer.

Preferably, the thin-film magnetic of the present invention further comprises a gap-depth-defining insulating layer provided on the lower magnetic pole layer and extending from a position which is distant from a face opposing a recording medium by a predetermined distance in the height direction.

Alternatively, the thin-film magnetic head of the present invention further comprises a gap-depth-defining insulating layer extending from a position distant from a face opposing a recording medium by a predetermined distance in the height direction, wherein the gap-defining insulating layer and an insulating layer lying between the coil layer and the lower core layer are integrally formed.

Preferably, the gap-distance-defining insulating layer comprises an organic insulating material.

Preferably, the coil-insulating layer comprises an organic insulating material.

A second aspect of the present invention relates to a method for making a thin-film magnetic head comprising the steps of:

(a) forming a lower magnetic pole layer on a lower core layer from a face opposing a recording medium to a position distant from the face opposing the recording medium by a predetermined length in the height direction;

(b) forming a nonmagnetic gap layer over the lower magnetic pole layer and the lower core layer behind the lower magnetic pole layer in the height direction;

(c) forming a coil layer on the gap layer directly or separated by an insulating layer provided therebetween;

(d) covering the coil layer by a coil-insulating layer; and (e) forming an upper core layer over the coil-insulating layer and the lower magnetic pole layer so that the width of the upper core layer is equal to a track width at an exposed face opposing a recording medium.

In the above method, the lower magnetic pole layer is formed on the lower core layer. The lower magnetic pole layer can be formed directly on the lower core layer by plating without providing a plating underlayer. The formation of the coil etc is the same as that in conventional processes.

In the above method, the lower magnetic pole layer is formed on the lower core layer and the coil layer and the coil-insulating layer are formed on the lower core layer which is indented from the surface of the lower magnetic pole layer. Thus, the protrusion of the coil-insulating layer from the surface of the lower magnetic pole layer can be reduced.

The upper core layer is generally formed by a frame plating process. In the above method, a resist layer is formed on a surface for forming the upper core layer, that is, over the lower magnetic pole layer and the coil-insulating layer.

Since the protrusion of the coil-insulating layer from the surface of the lower magnetic pole layer can be suppressed compared to the conventional configurations, the thickness of the resist layer can be reduced on the lower magnetic pole layer and is uniform in the entire region. Thus, resolution in the exposure step is improved and irregular reflection is reduced. As a result, the front end of the upper core layer having the track width Tw can be precisely formed on the lower magnetic pole layer.

A third aspect of the present invention relates to a method for making a thin-film magnetic head comprising the steps of:

(f) forming planarization layers composed of an insulating material extending from a face opposing a recording medium along the height direction on two sides in the track width direction of a lower core layer;

(g) milling the surface of the lower core layer and the surfaces of the planarization layers along the height direction from a position distant from the face opposing a recording medium so that the height of these surfaces is less than the height of surfaces of other regions, in order to form a coil-forming area and to define a lower magnetic pole layer integrally protruding from the lower core layer at the face opposing a recording medium;

(h) forming a nonmagnetic gap layer over the lower magnetic pole layer and the coil-forming area;

(i) forming a coil layer on the gap layer in the coil-forming region, directly or with another insulating layer provided therebetween; and (j) covering the coil layer by a coil-insulating layer;

(k) forming an upper core layer over the lower magnetic pole layer and the coil-insulating layer, wherein the width of the upper core layer exposed at the face opposing a recording medium is a track width Tw.

In this method, a thick lower core layer is previously formed, and is etched away in an area for forming the coil layer. Thus, the lower core layer has a protruding portion at the face opposing a recording medium. This protruding portion corresponds to the lower magnetic pole layer. That is, in this method, the lower magnetic pole layer is integrally formed with the lower core layer.

This method is preferable to the above-mentioned method for forming the lower magnetic pole layer on the lower core layer, since the front end of the upper core layer can be more precisely formed within the track width Tw.

Since in this method, the planarization layers (for example, $Al_2O_3$ layers) are provided on both sides of the lower magnetic pole layer in the track width direction and the height of the planarization layers is the same as the surface of the lower magnetic pole layer. Thus, the resist layer having a thinner and more uniform thickness can be formed on the flat surface. As a result, the front end of the upper core layer can be formed more precisely within the track width Tw.

In the second aspect, the method comprises, instead of the steps (g), (h), and (i), the following steps:

(l) forming a nonmagnetic gap layer on the lower core layer and the porous layer;

(m) milling the gap layer, the lower core layer, and the planarization layers along the height direction from a position which is distant from the face opposing a recording medium so that the height of these surfaces is less than the height of surfaces of other regions, in order to form a coil-forming area and to define a lower magnetic pole layer which is integrated with and protrudes from the lower core layer and is provided with the gap layer thereon at the face opposing a recording medium;

(n) forming an insulating layer on the lower core layer and the planarization layers in the coil-forming region; and (o) forming a coil layer on the insulating layer.

In these steps, the gap layer is formed over the lower core layer and the planarization layers, and then the lower core layer and the planarization layers are polished to form an area for forming the coil layer. Thus, the gap layer still remains on the lower magnetic pole layer after the polishing steps.

When the gap layer is formed on the lower core layer, the gap layer may be used as in insulating layer between the coil layer and the lower core layer, and the coil layer may be directly formed by patterning on the gap layer. In the above method, however, the gap layer on the lower core layer is removed for forming the coil layer. Thus, the insulating layer is formed on the lower core layer and then the coil layer is formed on the insulating layer.

Preferably, the method further comprises the following step, lying between the step (n) and the step (o), of:

(p) forming a gap-defining insulating layer at a portion distant from the face opposing a recording medium in the height direction at least on the lower magnetic pole layer.

Preferably, the method according to the second or third aspect further comprises the steps, subsequent to the step (e) or (k), of:

(q) removing the gap layer extending from the upper core layer having the track width Tw toward both sides in the track width direction;

(r) milling the upper face of the lower magnetic pole layer at both sides of the track width Tw so that the lower magnetic pole layer has a protruding portion having a width which is equal to the track width Tw at the junction with the gap layer; and (s) forming sloping faces extending from both bottom corners of the protruding portion toward directions departing from the upper core layer along the track width direction on the lower magnetic pole layer.

Alternatively, in the step (s), both upper faces of the lower core layer and both upper faces, which are thereby exposed, of the upper core layer may be milled to form sloping faces of the lower core layer continuing from the sloping faces of the lower magnetic pole layer.

The method may further comprises the following steps, instead of the steps (r) and (s), of:

(t) milling both sides of the track width Tw of the lower magnetic pole layer in the track width direction so that the lower magnetic pole layer has a rectangular shape in which the width at the junction with the gap layer is equal to the track width Tw or a trapezoidal shape in which the width at the junction with the gap layer is larger than the width at the junction with the lower core layer; and (u) forming sloping faces on the lower core layer, the sloping faces extending from both bottom corners of the lower magnetic pole layer toward directions departing from the upper core layer along the track width direction.

As described above, the protruding portion and the sloping faces of the lower magnetic pole layer and the protruding portion and the sloping faces of the lower core layer can adequately reduce write fringing of the thin-film magnetic head.

DESCRIPTION OF THE PREFERRED EMBODIMENTS

Figure 1:
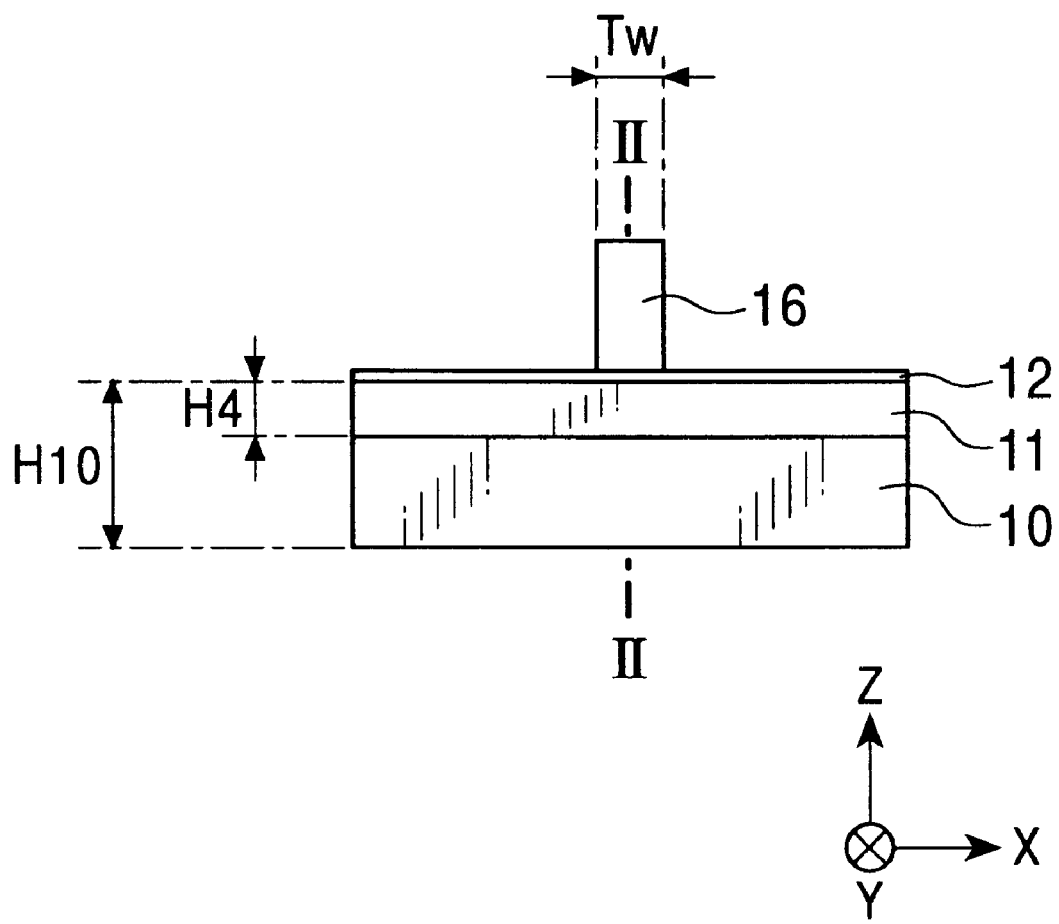
FIG. 1 is a partial front view of an embodiment of a thin-film magnetic head in accordance with the present invention.
Figure 2:
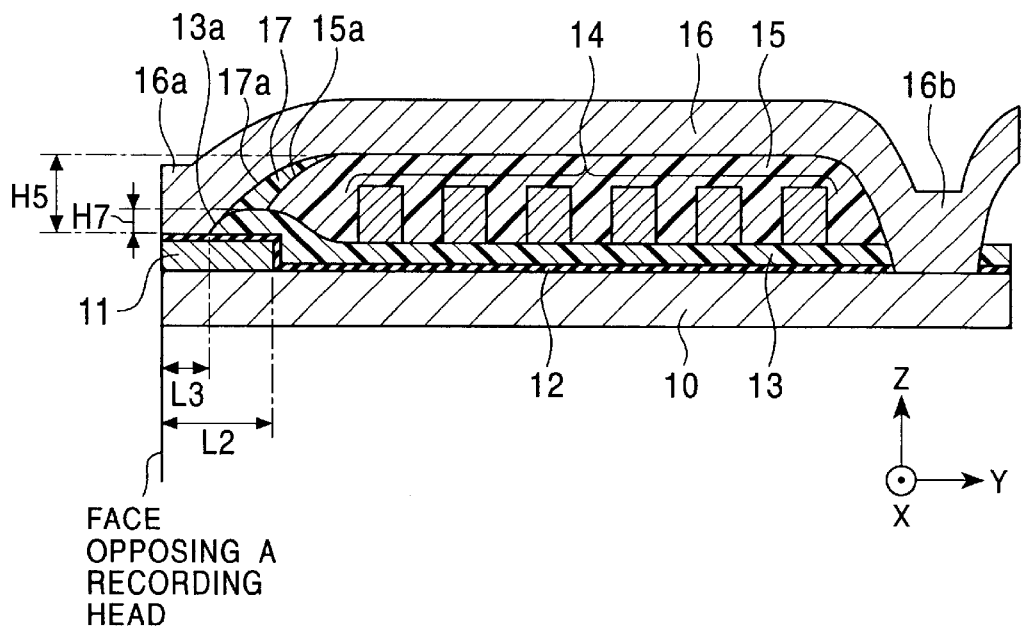
FIG. 2 is a partial cross-sectional view of the thin-film magnetic head taken from line II—II in FIG. 1.

FIG. 1 is a partial front view of an embodiment of a thin-film magnetic head in accordance with the present invention, viewed from a face opposing a recording medium, and FIG. 2 is a partial cross-sectional view of the thin-film magnetic head taken from line II—II in FIG. 1.

The thin-film magnetic head shown in FIGS. 1 and 2 is an inductive write head. The thin-film magnetic head in the present invention may be a combined thin-film magnetic head including a read head having a magnetoresistive effect (MR head) deposited on the inductive write head.

In FIG. 1, numeral 10 represents a lower core layer composed of a magnetic material such as Permalloy. When a read head is deposited under the lower core layer 10, another shielding layer may be provided, in addition to the lower core layer 10, to protect the magnetoresistive element from noise, or the lower core layer 10 may be used as an upper shielding layer of the read head, without providing the other shielding layer.

As shown in FIG. 1, a lower magnetic pole layer 11 is formed on the lower core layer 10. The lower magnetic pole layer 11 is exposed at the face opposing a recording medium, as in the lower core layer 10. The bottom face of the lower magnetic pole layer 11 is magnetically coupled with the lower core layer 10. The lower magnetic pole layer 11 and the lower core layer 10 may be composed of the same material or different materials. In order to improve the recording density, the lower magnetic pole layer 11 is preferably composed of a magnetic material having a higher saturation magnetic flux density compared to the lower core layer 10.

As shown in FIG. 1, the lower magnetic pole layer 11 has a height H4. The height H4 is preferably 30% to 70% of the total thickness H10 which corresponds to the sum of the thickness of the lower magnetic pole layer 11 and the thickness of the lower core layer 10. Preferably, the height H4 is in a range of 0.5 $\mu$m to 1.5 $\mu$m. A thickness less than 0.5 $\mu$m adversely affects magnetic properties, whereas a thickness exceeding 1.5 $\mu$m undesirably results in an increased distance between the read portion and the write portion due to an increased total thickness H10.

As shown in FIG. 2, the lower magnetic pole layer 11 has a length L2 in the height direction (Y direction in the drawing) and has a rectangular cross-section on the lower core layer 10. The length L2 must be smaller than a gap depth Gd (length L3 shown in FIG. 2), as described below. Preferably, the length L2 is within a range of 1 $\mu$m to 5 $\mu$m.

In this embodiment, as shown in FIG. 1, the width of the lower core layer 10 and the width of the lower magnetic pole layer 11 are the same in the track width direction (X direction in the drawing). The lower magnetic pole layer 11, however, may have any other shape, as described below.

As shown in FIG. 2, a gap layer 12 is formed in the height direction (Y direction in the drawing) over the lower magnetic pole layer 11 and the lower core layer 10. The gap layer 12 is composed of an inorganic insulating material which is preferably at least one selected from $Al_2O_3$, $SiO_2$, SiON, AlN, and AlSiN.

The gap layer is exposed, as shown in FIGS. 1 and 2, at the face opposing a recording medium, and the thickness of the gap layer 12 defines the gap length. Accordingly, the thickness of the gap layer 12 is preferably small as much as possible to meet future trends toward high-recording density.

As shown in FIG. 2, an insulating layer 13 is formed on the gap layer 12. The insulating layer 13 has a front end 13a which is distant from the face opposing a recording medium by a length L3 in the height direction (Y direction in the drawing), and extends on the gap layer 12, which is formed over the insulating layer 13 and the lower core layer 10. Herein, the length L3 defines the gap depth Gd. Since the gap depth Gd significantly affects electric characteristics of the thin-film magnetic head, the gap depth Gd must be precisely determined and formed. In this embodiment, insulating layer 13 controls the length L3 as the gap depth Gd. Moreover, the insulating layer 13 improves the isolation voltage between a coil layer 14 (described below) and the lower core layer 10.

The insulating layer 13 may be composed of an inorganic insulating material or an organic insulating material. The insulating layer 13, however, preferably has a rounded sloping front face 13a so that an upper core layer 16 described below has a gentle slope on the front face 13a. Thus, the insulating layer 13 is preferably composed of the organic insulating material so that the front face 13a has an appropriate slope. In addition, the insulating layer 13 composed of the organic insulating material improves the insulating voltage between the coil layer 14 and the lower core layer 10. The organic insulating material may be any known material, such as a resist or polyimide.

As shown in FIG. 2, the coil layer 14 composed of a nonmagnetic conductive material having low electrical resistance such as copper is spirally formed on the insulating layer 13. Moreover, the coil-insulating layer 15 is formed on the coil layer 14. Thus, the coil layer 14 is completely covered with the coil-insulating layer 15. The coil-insulating layer 15 may be composed of either an inorganic insulating material or an organic insulating material. Also, the coil-insulating layer 15 must have a rounded sloping face 15a at the front end thereof, as in the insulating layer 13, so that the upper core layer 16 has a gentle slope. Thus, the coil-insulating layer 15 is preferably composed of the organic insulating material.

In this embodiment, an insulating layer 17 is formed on the sloping face 15a of the coil-insulating layer 15. This insulating layer 17 is also composed of an organic insulating material, as in the coil-insulating layer 15.

If the insulating layer 17 is not formed, the upper core layer 16 must be formed directly on the sloping face 15a of the coil-insulating layer 15. In the case shown in FIG. 2, the position of the sloping face 15a of the coil-insulating layer 15 is shifted in the Y direction in the drawing relative to the front face 13a of the insulating layer 13. Accordingly, the upper core layer 16 must be formed on the significantly uneven surface profile over the front face 13a of the insulating layer 13 and the sloping face 15a of the coil-insulating layer 15. As a result, the upper core layer 16 cannot be formed by a frame plating process with a high patterning precision and thus does not have a predetermined shape.

In the embodiment shown in FIG. 2, the insulating layer 17 is formed on the sloping face 15a of the coil-insulating layer 15 to form a gentle sloping face over the sloping face 17a of the coil-insulating layer 17 and the front face 13a of the insulating layer 13. Thus, the upper core layer 16 can be formed with a high patterning precision.

When the coil-insulating layer 15 extends to a region for the insulating layer 17 so that the sloping face 15a of the coil-insulating layer 15 and the front face 13a of the insulating layer 13 form a smooth continuous sloping face, the insulating layer 17 is not necessary.

As shown in FIG. 2, a front end 16a of the upper core layer 16 opposes the upper face of the lower magnetic pole layer 11 with the insulating layer 13 provided therebetween. The upper core layer 16 extends over the front end 16a, the front face 13a of the insulating layer 13, the sloping face 17a, and the coil-insulating layer 15 in the height direction (Y direction in the drawing), and comes into direct contact with the upper face of the lower core layer 10 at a base end 16b. A magnetic path length is thereby defined by the upper core layer 16, the lower core layer 10, and the lower magnetic pole layer 11.

As shown in FIG. 1, at the face opposing a recording medium, the upper core layer 16 is exposed to define the track width Tw. In order to achieve a narrower track width which satisfies recent trends toward high-density recording, the track width Tw is preferably within a range of 0.5 µm to 1.5 µm.

As described above, the lower magnetic pole layer 11 is formed on the lower core layer 10 at the face opposing a recording medium and the coil layer 14 is formed behind the lower magnetic pole layer 11 in the height direction on the lower core layer 10 separated by the insulating layer 13, in the present invention.

Moreover, the upper core layer 16 is formed over the gap layer 12 on the lower magnetic pole layer 11 and the coil-insulating layer 15 on the coil layer 14 in the present invention. The coil-insulating layer 15 has a height (protrusion) H5 from the surface, as a reference plane, of the gap layer 12 on the lower magnetic pole layer 11. The height H5 in the present invention is smaller than the height (protrusion) H3 of the coil-insulating layer 5 in the conventional thin-film magnetic head shown in FIG. 25.

Since the lower magnetic pole layer 11 is formed on the lower core layer 10 in the present invention, the height (protrusion) of the coil-insulating layer 15 is determined by the surface, as a reference plane, of the gap layer 12 on the lower magnetic pole layer 11. In contrast, in the conventional thin-film magnetic head not having the lower magnetic pole layer 11, the protrusion of the coil-insulating layer 5 is determined by the surface, as a reference plane, of the gap layer 3 on the lower core layer 1. Accordingly, the protrusion of the coil-insulating layer 15 can be suppressed by at least a thickness corresponding to the thickness of the lower magnetic pole layer 11, in the present invention.

When the protrusion of the coil-insulating layer 15 is reduced, the thickness of a resist layer used in a frame plating process can be reduced on the lower magnetic pole layer 11 and is more uniform than that of the conventional head. Thus, resolution in the exposure and develop step is improved without irregular reflection. As a result, the front end 16a of the upper core layer 16 can be formed within the track width Tw and a high patterning precision.

The resulting thin-film magnetic head has a narrower track width and is suitable for high-density recording.

Since the height of the protrusion of the coil-insulating layer 15 can be reduced in the present invention, the length from the front end 16a to the base portion 16b of the upper core layer 16 is less than that in conventional thin-film magnetic heads. Such a decrease in the length of the upper core layer 16 results in a reduced magnetic path length and a reduced inductance of the thin-film magnetic head. Accordingly, the resulting thin-film magnetic head has a narrower track width and is suitable for high-density recording.

Figure 3:
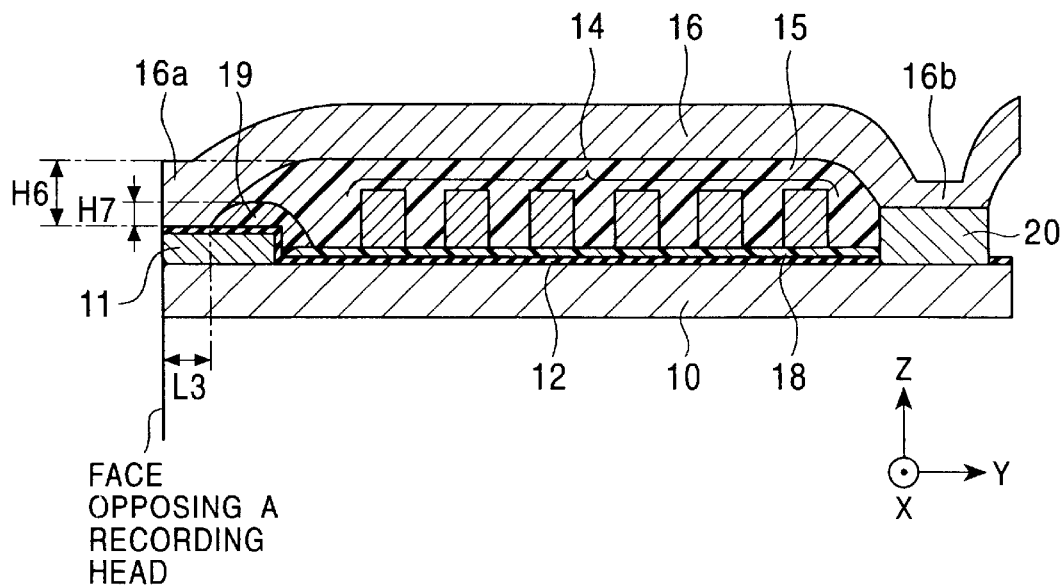
FIG. 3 is a partial cross-sectional view of another embodiment of the thin-film magnetic head in accordance with the present invention.

FIG. 3 is a partial cross-sectional view of another embodiment of the thin-film magnetic head in accordance with the present invention. A significant difference in the structure between this embodiment and the embodiment shown in FIG. 2 is the configuration of the insulating layer between the coil layer 14 and the lower core layer 10. The insulating layer defining the gap depth (Gd-defining insulating layer) and the insulating layer 13 for insulating the coil layer 14 from the lower core layer 10 are integrally formed in FIG. 2, whereas an insulating layer 18 for insulating the coil layer 14 from the lower core layer 10 and a Gd-defining insulating layer 19 are separately formed in FIG. 3.

By providing separately the insulating layer 18 and the Gd-defining insulating layer 19, the height of the protrusion of the coil-insulating layer 15 from the lower magnetic pole layer 11 on the lower magnetic pole layer 11 can be reduced.

When the insulating layer 13 has, as shown in FIG. 2, both the Gd defining function and the insulation function between the coil layer 14 and the lower core layer 10, the thickness of the insulating layer 13 on the lower magnetic pole layer 11 has a thickness H7 which must be relatively large. If the thickness H7 is smaller, the insulating layer 17 covering the insulating layer 13 is not readily aligned to the front face 13a of the insulating layer 13. Thus, the gap depth Gd is not readily defined at the position of the insulating layer 13. Accordingly, in order to improve the Gd defining function, the thickness of the insulating layer 13 on the lower magnetic pole layer 11 must be relatively large. Such a large thickness H7 of the insulating layer 13 results in a relatively large thickness of the insulating layer 13 on the lower core layer 10. Thus, it is preferable that the thickness of the insulating layer 13 on the lower core layer 10 be small as much as possible in order to minimize the height H5 of the protrusion of the coil-insulating layer 15 on the gap layer 12.

In the embodiment shown in FIG. 3, the insulating layer 18 formed between the lower core layer 10 and the coil layer 14 is separately formed from the Gd-defining insulating layer 19, and can have a smaller thickness. The insulating layer 18 may be composed of an organic insulating material or an inorganic insulating material, and is preferably composed of an organic insulating material to adequately ensure a higher isolation voltage. In FIG. 3, the Gd-defining insulating layer 19 is formed from a position which is distant from the face opposing a recording medium by a predetermined distance L3 (gap depth) in the height direction (Y direction in the drawing), and the thickness H7 of the Gd-defining insulating layer 19 is large, as in the insulating layer 13 shown in FIG. 2.

Since the thickness of the insulating layer 18 is small, the height H6 of the protrusion of the coil-insulating layer 15 from the gap layer 12 on the lower magnetic pole layer 11 is smaller than the height H5 of the coil-insulating layer 15 shown in FIG. 2. It is confirmed that the height H6 can be reduced by 3 to 5 μm compared to that of a conventional structure. In the embodiment shown in FIG. 3, the front end 16a having the track width Tw of the upper core layer 16 can be precisely formed by patterning within a predetermined range.

If only the gap layer 12 on the lower core layer 10 functions as the insulating layer for insulating the coil layer 14 from the lower core layer 10 without providing an insulating layer 18 on the gap layer 12, the height of the coil-insulating layer 15 protruding from the gap layer 12 on the lower magnetic pole layer 11 can be minimized. The gap layer 12, however, does not ensure sufficient insulation between the lower core layer 10 and the coil layer 14. Thus, it is preferable that the insulating layer 18 having a high insulation voltage composed of an organic insulating material regardless of a small thickness be provided.

In the embodiment shown in FIG. 3, a back gap layer 20 is provided at a back portion of the lower core layer 10. The upper core layer 16 of the upper core layer 16 is in direct contact with the upper face of the back gap layer 20. A magnetic path length is thereby defined by the upper core layer 16, the back gap layer 20, the lower core layer 10, and the lower magnetic pole layer 11. The back gap layer 20 facilitates magnetic coupling between the lower core layer 10 and the upper core layer 16 of the upper core layer 16 in the production process.

Figure 4:
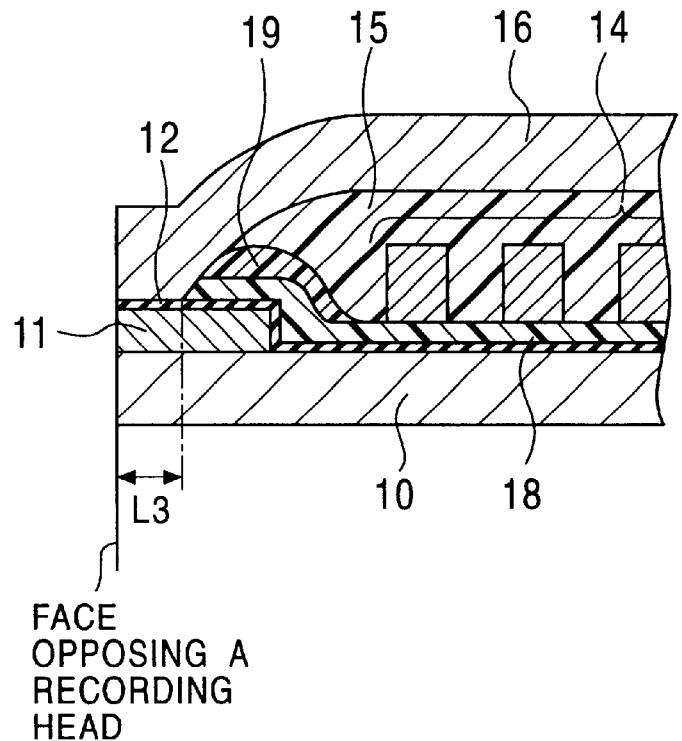
FIG. 4 is a partial cross-sectional view of another embodiment of the thin-film magnetic head in accordance with the present invention.
Figure 5:
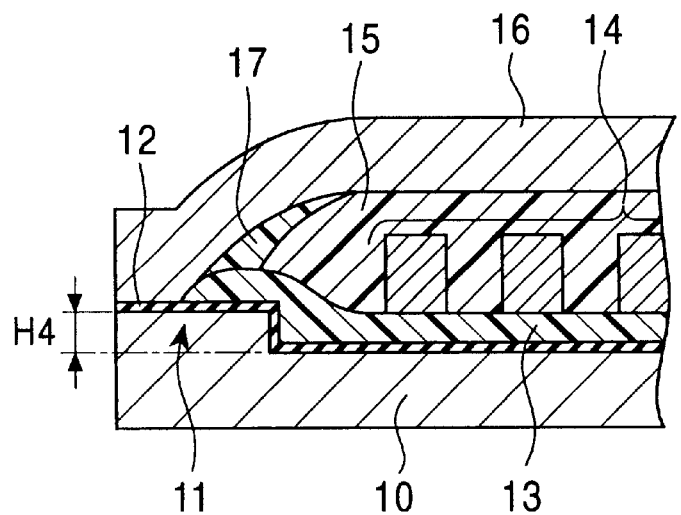
FIG. 5 is a partial cross-sectional view of another embodiment of the thin-film magnetic head in accordance with the present invention.

FIGS. 4 and 5 are partial cross-sectional views of structures in the vicinity of faces opposing recording media of thin-film magnetic heads.

In the embodiment shown in FIG. 4, the insulating layer 18 for insulating the coil layer 14 from the lower core layer 10 extends to the upper face of the lower magnetic pole layer 11 with a predetermined distance L3 in the height direction (Y direction in the drawing) from the face opposing a recording medium. This distance L3 defines the gap depth Gd. Since the insulating layer 18 has a small thickness, the Gd-defining insulating layer 19 having a larger thickness is deposited on the insulating layer 18 so as to more adequately define the gap depth Gd.

The thin-film magnetic head shown in FIG. 5 is a modification of that shown in FIG. 2. The lower core layer 10 has a platform having a height H4 at the face opposing a recording medium and this platform corresponds to the lower magnetic pole layer 11 shown in FIG. 2. In other words, the lower core layer 10 and the lower magnetic pole layer 11 are integrally formed in the embodiment shown in FIG. 5.

In FIG. 5, the gap layer 12 is formed only on the lower magnetic pole layer 11, but not on the lower core layer 10.

The back gap layer 20 shown in FIG. 3 may also be integrally formed with the lower core layer 10, although not shown in the drawing.

The Gd-defining insulating layer 19 or the insulating layer 13 is formed in each of the embodiments shown in FIGS. 2 to 5. The Gd-defining insulating layer 19 may be not formed in the present invention. In such a case, the coil-insulating layer 15 or the insulating layer 17 on the lower magnetic pole layer 11 is properly aligned to define the gap depth Gd when the coil layer 14 is covered by the coil-insulating layer 15 or the insulating layer 17.

Figure 6:
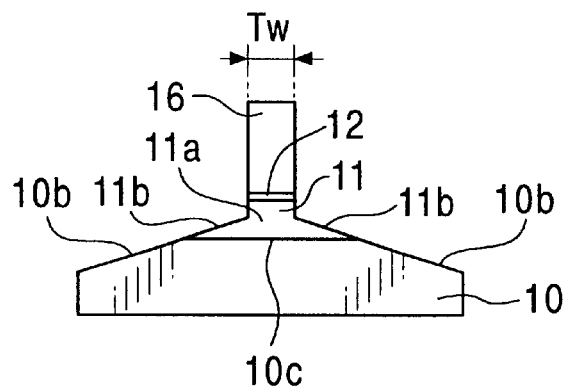
FIG. 6 is a partial front view of another embodiment of the thin-film magnetic head in accordance with the present invention.
Figure 7:
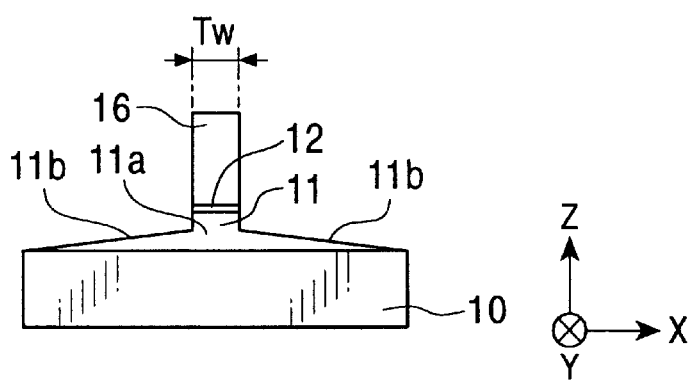
FIG. 7 is a partial front view of another embodiment of the thin-film magnetic head in accordance with the present invention.
Figure 8:
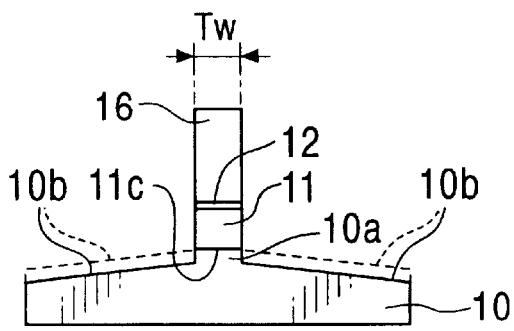
FIG. 8 is a partial front view of another embodiment of the thin-film magnetic head in accordance with the present invention.

FIGS. 6 to 8 are partial front views showing structures of thin-film magnetic heads exposed at faces opposing recording media.

In FIG. 6, the gap layer 12 is disposed between the upper core layer 16 having a track width Tw and the lower magnetic pole layer 11. Thus, the gap layer 12 also has the track width Tw and the lower magnetic pole layer 11 has the track width Tw at the protruding portion 11a in contact with the gap layer 12. Moreover, the lower magnetic pole layer 11 extends at the base portion 11c and has sloping faces 11b in the track width direction. The bottom face of the base portion 11c is in contact with a flat upper face 10c of the lower core layer 10. The lower core layer 10 also has sloping faces 10b continuing from the sloping faces 11b of the lower magnetic pole layer 11.

In the embodiment shown in FIG. 7, the gap layer 12 has a track width Tw, as in FIG. 6, and the lower magnetic pole layer 11 has a protruding portion 11a having the track width Tw and has sloping faces 11b extending from the bottom corners of the protruding portion 11a toward directions departing from the upper core layer 16 at both sides. That is, only the lower magnetic pole layer 11 has the sloping faces 11b while the lower core layer 10 does not have the sloping faces 10b, as shown in FIG. 6.

In the embodiment shown in FIG. 8, the gap layer 12 having the track width Tw is disposed between the upper core layer 16 and the lower magnetic pole layer 11. The lower magnetic pole layer 11 is rectangular and thus has the track width Tw from the top in contact with the gap layer 12 to the bottom 11c in contact with the lower core layer 10. The lower core layer 10 has a protruding portion 10a having the track width Tw and sloping faces 10b extending from the bottom corners of the protruding portion 10a toward directions departing from the upper core layer 16 at both sides in the track width direction. This protruding portion 10a may be omitted as shown by dotted lines in FIG. 8. In such a case, the sloping faces 10b extend directly from the bottom corners of the lower magnetic pole layer 11.

In the protruding portion 11a of the lower magnetic pole layer 11 and the protruding portion 10a of the lower core layer 10 shown in FIGS. 6 to 8, the width is the same from the top to the bottom, and the cross-section of the protruding portion is rectangular. The width, however, may be larger than at the bottom so that the cross-section of the protruding portion is trapezoidal.

In the lower magnetic pole layer 11 and the lower core layer 10 shown in FIGS. 7 and 8, the sloping faces 10b and 11b may not tilt. That is, flat faces are provided instead of the sloping faces 10b and 11b in the track width direction (X direction in the drawing).

When the lower core layer 10 and the lower magnetic pole layer 11 are integrally formed as shown in FIG. 5, it is preferable that the lower magnetic pole layer 11 is integrated with and protrudes from the lower core layer 10. In this case, the lower core layer 10 preferably has sloping faces 10b extending from the bottom corners of the lower magnetic pole layer 11 toward directions departing from the upper core layer at both sides in the track width direction.

In FIGS. 6 to 8, the lower magnetic pole layer 11 has the track width Tw at the junction with the gap layer 12 and has the protruding portion 11a or the sloping faces 11b. Also, the lower core layer 10 has the protruding portion 10a or the sloping faces 10b. As a result, the two upper faces of the lower magnetic pole layer 11 or the two upper faces of the lower core layer 10 are adequately distant from the upper core layer 16. Thus, write fringing can be adequately reduced and the thin-film magnetic head can has a narrower track width compared to the conventional thin-film magnetic head shown in FIG. 1.

FIGS. 9 to 12 are partial cross-sectional views showing steps for making the thin-film magnetic head shown in FIG. 2.

Figure 9:
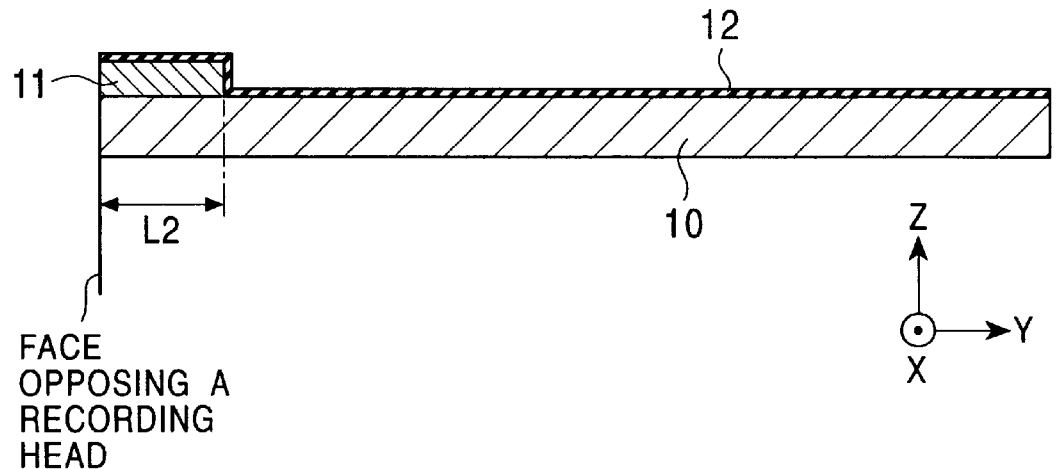
FIG. 9 is a cross-sectional view showing a step of a method for making the thin-film magnetic head shown in FIG. 2.

With reference to FIG. 9, a lower magnetic pole layer 11 is formed from the face opposing a recording medium on a lower core layer 10 so as to have a predetermined length L2 in the height direction (Y direction in the drawing). The length L2 must be larger than a gap depth Gd described below. In the present invention, the lower magnetic pole layer 11 can be deposited by plating using the lower core layer 10 as a plating underlayer. Thus, this process requires no additional plating underlayer.

Next, a gap layer is formed over the lower magnetic pole layer 11 and the lower core layer 10 by any known process, for example, a sputtering process. The gap layer 12 is composed of at least one inorganic insulating material selected from $Al_2O_3$, $SiO_2$, SiON, AlN, and AlSiN.

Figure 10:
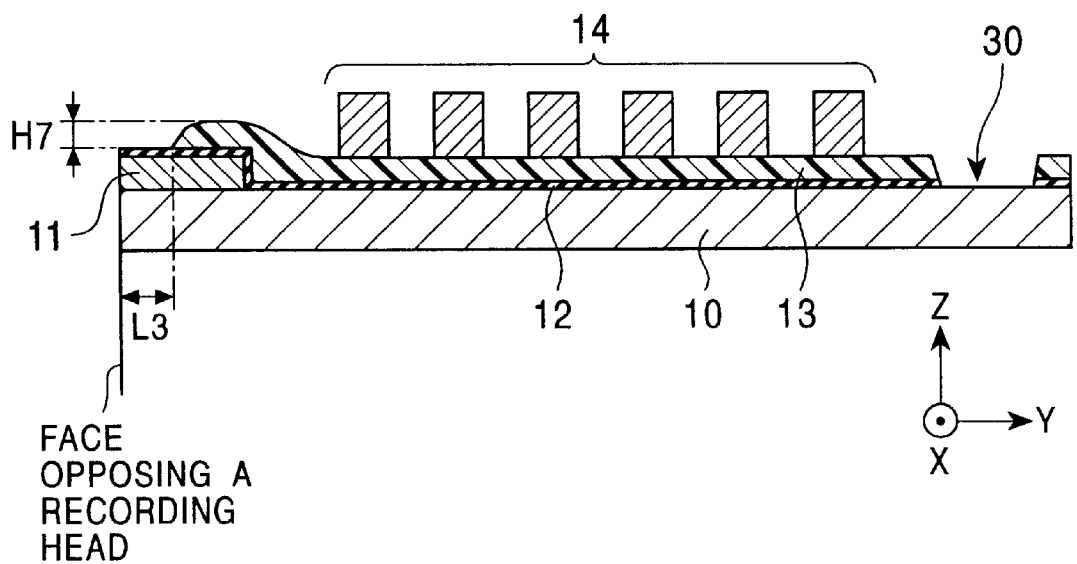
FIG. 10 is a cross-sectional view showing a step subsequent to the step shown in FIG. 9.

With reference to FIG. 10, an insulating layer 13 is formed on the gap layer 12 with a predetermined distance L3 from the face opposing a recording medium in the height direction (Y direction in the drawing). The insulating layer 13 may be formed of an inorganic insulating material or organic insulating material, and is preferably formed of an organic insulating material. The insulating layer 13 has a height H7 above the lower magnetic pole layer 11. The front end of the insulating layer 13 on the lower magnetic pole layer 11 defines the distance L3 and thus defines the gap depth Gd. Accordingly, the front end of the insulating layer 13 functions as a Gd-defining insulating layer. The insulating layer 13 also insulates the coil layer 14 from the lower core layer 10.

Next, a coil layer 14 is spirally patterned behind the lower magnetic pole layer 11 in the height direction (Y direction in the drawing) on the insulating layer 13. The coil layer 14 is composed of a conductive material having high conductivity, such as Cu. A hole 30 is formed through the insulating layer 13 and the gap layer 12 at a back region so as to expose the surface of the lower core layer 10.

Figure 11:
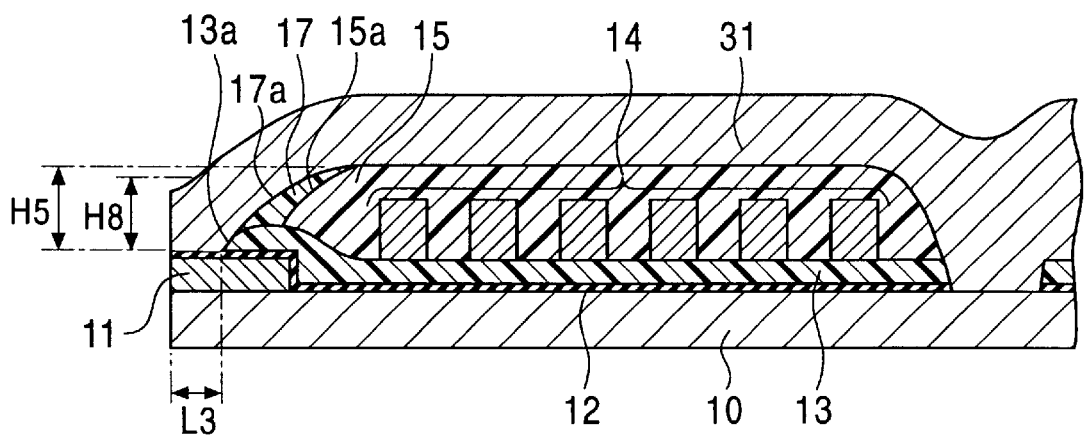
FIG. 11 is a cross-sectional view showing a step subsequent to the step shown in FIG. 10.

With reference to FIG. 11, the coil layer 14 on the insulating layer 13 is covered by a coil-insulating layer 15. The coil-insulating layer 15 is formed of an organic insulating material. Next, an insulating layer 17 formed of an organic insulating material is formed on a sloping face 15a of the coil-insulating layer 15 so that a sloping face 17a of the insulating layer 17 is aligned to the front face 13a of the insulating layer 13. The sloping face 17a of the insulating layer 17 and the front face 13a of the insulating layer 13 are thereby continuously formed. In the subsequent step, an upper core layer 16 is formed on a continuous sloping face.

When the sloping face 15a of the coil-insulating layer 15 is aligned to the front face 13a of the insulating layer 13 so that the front face 13a and the sloping face 17a forms a continuous sloping face, the insulating layer 17 is unnecessary, resulting in reduced production steps.

Next, a plating underlayer (not shown in the drawing) is formed over the exposed front end with the length L3 of the gap layer 12, the front face 13a of the insulating layer 13, the sloping face 17a of the insulating layer 17, and the coil-insulating layer 15. A resist layer 31 is formed on the plating underlayer. The resist layer 31 is used to form a pattern of the upper core layer 16 when the upper core layer 16 is formed by a frame plating process.

In the present invention, as described above, the lower magnetic pole layer 11 is formed on the lower core layer 10, and the coil layer 14 is formed behind the lower magnetic pole layer 11 on the lower core layer 10.

Figure 25:
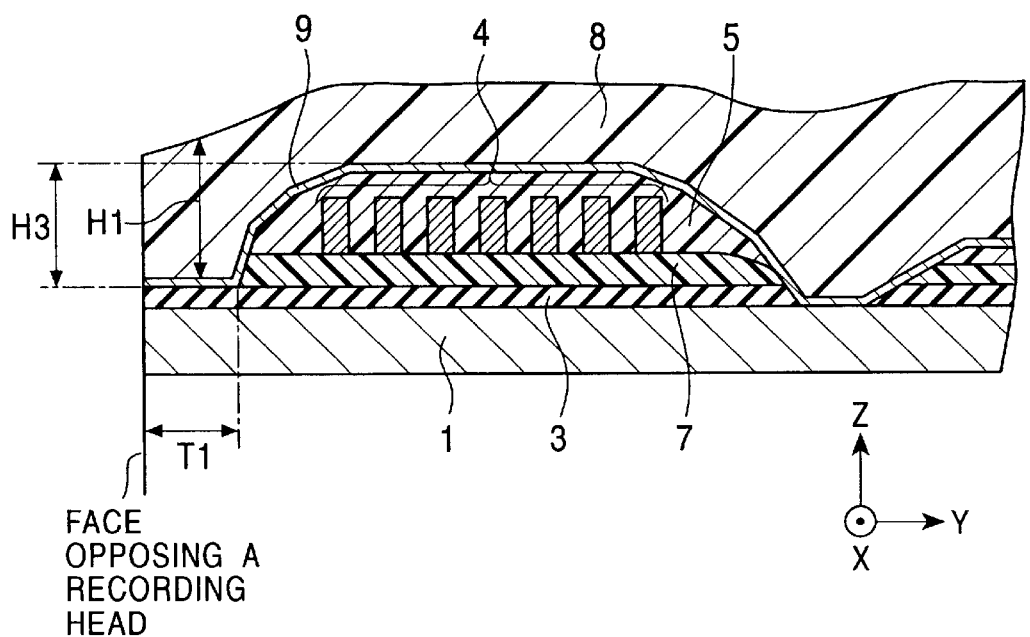
FIG. 25 is a cross-sectional view showing a production step of the conventional thin-film magnetic head.

In comparison with the conventional thin-film magnetic head shown in FIG. 25, the layer configuration including the insulating layer 13, the coil layer 14 shown in FIG. 11, and the coil-insulating layer 15 and the thickness of each layer are almost identical to those in the conventional configuration.

A significant difference between the present invention and the conventional configuration is that the lower magnetic pole layer 11 is formed on the lower core layer 10 and the upper core layer 16 is formed on the lower magnetic pole layer 11 in the present invention. That is, in the present invention, the total thickness of the insulating layer 13, the coil layer 14, and the coil-insulating layer 15 on the lower core layer 10 does not form a protrusion on the surface for forming the upper core layer 16 on the lower magnetic pole layer 11 as a reference plane. Thus, the height H5 of the protrusion of the coil-insulating layer 15 from the lower magnetic pole layer 11 is smaller than the height H3 of the protrusion of the coil-insulating layer 5 from the lower core layer 1 as a reference plane in FIG. 25.

Accordingly, the thickness H8 of the resist layer 31 formed on the gap layer 12 can be reduced compared to the conventional thin-film magnetic head. Moreover, the resist layer 31 can be formed so as to have a uniform thickness, improving the resolution in an exposure and develop step and reducing irregular reflection. Thus, the front end 16a having the track width Tw of the upper core layer 16 can be precisely formed within a predetermined range. Thus, the resulting thin-film magnetic head is suitable for trends toward a narrower track width.

Figure 12:
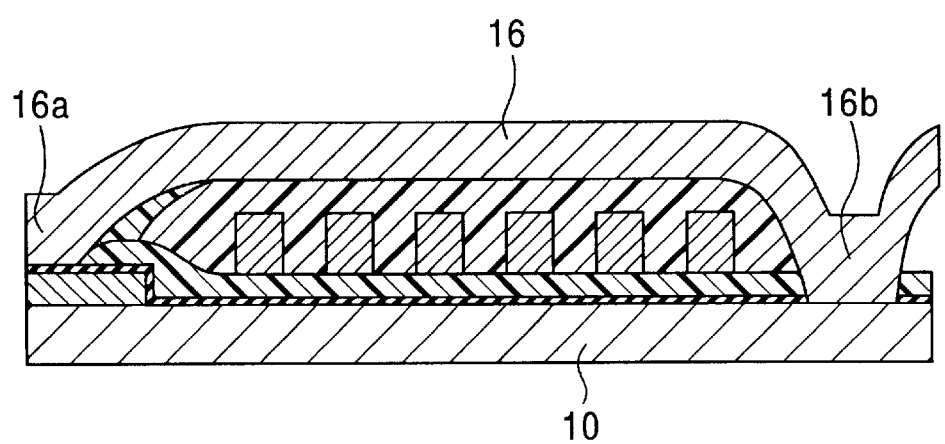
FIG. 12 is a cross-sectional view showing a step subsequent to the step shown in FIG. 11.

A layer of a magnetic material is deposited by plating into a patterned area for the upper core layer 16 formed by exposure and development of the resist layer 31, and the resist layer 31 is removed to complete the upper core layer 16 shown in FIG. 12.

With reference to FIG. 12, the front end 16a of the upper core layer 16 opposes the lower magnetic pole layer 11 with the gap layer 12 therebetween at the face opposing a recording medium. The base portion 16b of the upper core layer 16 is put into direct contact with the lower core layer 10 in the hole 30 (see FIG. 10). A magnetic path length is thereby defined by the upper core layer 16, the lower core layer 10, and the lower magnetic pole layer 11.

Figure 13:
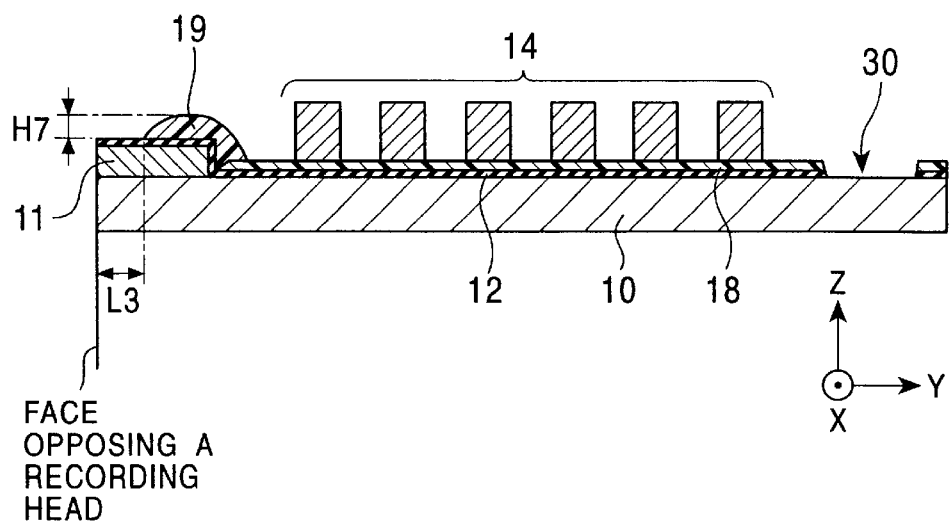
FIG. 13 is a cross-sectional view showing another step instead of the step shown in FIG. 10.

FIG. 13 shows another step substituting for the step shown in FIG. 10. In FIG. 13, an insulating layer 18 is formed behind the lower magnetic pole layer 11 in the height direction (Y direction in the drawing) on the gap layer 12 on the lower core layer 10. The insulating layer 18 may be formed of an inorganic insulating material or an organic insulating material, and is preferably formed of an organic insulating material in order to ensure a higher isolation voltage between the coil layer 14 and the lower core layer 10.

In this embodiment, the thickness of the insulating layer 18 is preferably small as much as possible as long as a predetermined isolation voltage is maintained. A reduction in the thickness of the insulating layer 18 can reduce the protrusion of the coil-insulating layer 15 for covering the coil layer 14 from the gap layer 12. As a result, the front end 16a of the upper core layer 16 can be more precisely formed so as to have a track width Tw.

Although the gap layer 12 may be used as an insulating layer without providing the insulating layer 18, such a configuration causes a decrease in the isolation voltage. Moreover, the formation of the insulating layer 18, as shown in FIG. 13, is preferable in order to achieve effective magnetic shielding between the coil layer 14 and the lower core layer 10.

Furthermore, a Gd-defining insulating layer 19 is formed from a position which is distant from the face opposing a recording medium by a distance L3 in the height direction (Y direction in the drawing) on the lower magnetic pole layer 11. The Gd-defining insulating layer 19 is preferably formed of an organic insulating material. The Gd-defining insulating layer 19 is formed so as to have a thickness H7 from the gap layer 12 on the lower magnetic pole layer 11, and the thickness H7 is larger than the thickness of the insulating layer 18.

The Gd-defining insulating layer 19 may be not formed. In this case, the gap depth is defined by the front end 15a of a coil-insulating layer 15 and the front end 17a of an insulating layer 17.

The subsequent steps are identical to those shown in FIGS. 11 and 12. In FIG. 13, the hole 30 is formed through the gap layer 12 and the insulating layer 18 on the back end portion of the lower core layer 10. Alternatively, a back gap layer 20 may be provided on the lower core layer 10, as in the embodiment shown in FIG. 3. The back gap layer 20 makes the hole 30 unnecessary. The base end 16b of the upper core layer 16 is put into direct contact with the back gap layer 20 so that a magnetic path length is readily defined by the lower core layer 10 and the upper core layer 16.

Figure 14:
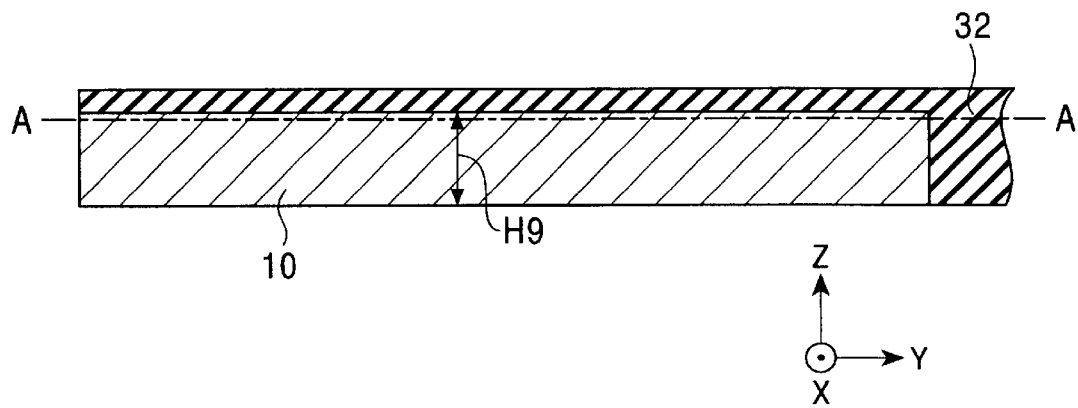
FIG. 14 is a cross-sectional view showing a step of another method for making the thin-film magnetic head.

FIGS. 14 to 19 show steps for integrally forming the lower core layer 10 and the lower magnetic pole layer 11. With reference to FIG. 14, a lower core layer 10 with a thickness H9 is formed on a substrate (not shown in the drawing). The thickness H9 corresponds to the sum of the thickness of the lower core layer 10 and the thickness H4 of the lower magnetic pole layer 11 in a completed thin-film magnetic head.

A planarization layer 32 extending in the track width direction (X direction in the drawing) and the height direction (Y direction in the drawing) is formed over the lower core layer 10 by a known process, such as a sputtering process. The planarization layer 32 is preferably formed of at least one inorganic insulating material selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

Figure 15:
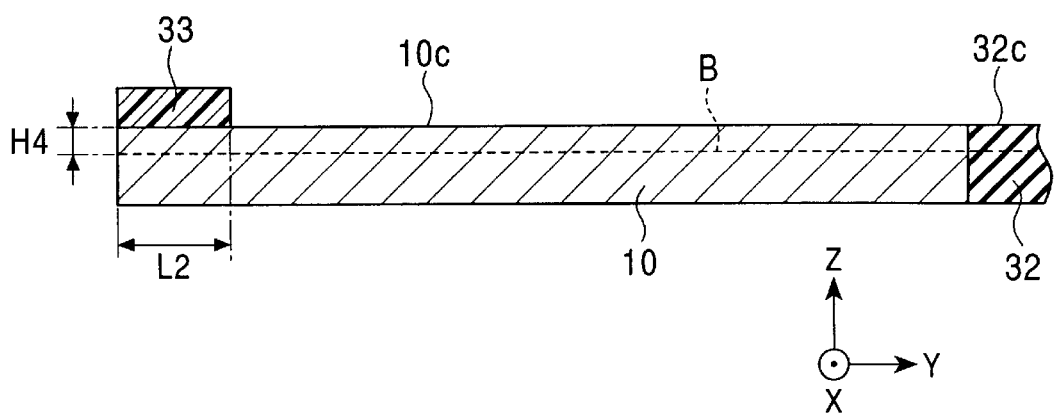
FIG. 15 is a cross-sectional view showing a step subsequent to the step shown in FIG. 14.

With reference to FIG. 14, the planarization layer 32 and the lower core layer 10 are polished by, for example, a CMP (chemical-mechanical polishing) technology up to line A—A. As shown in FIG. 15, the surface 10c of the lower core layer 10 and the surface 32c of the planarization layer 32 form a continuous planarization surface.

Figure 16:
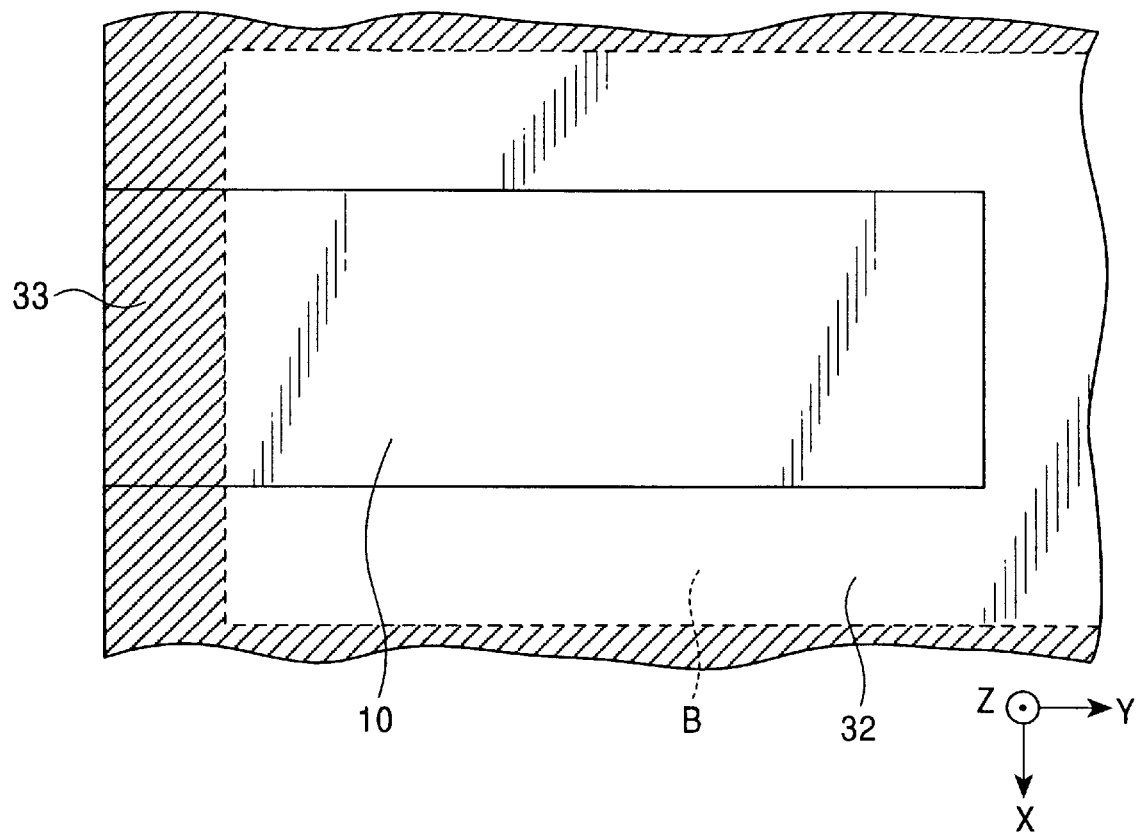
FIG. 16 is a partial front view of the thin-film magnetic head shown in FIG. 15.

Next, a resist layer 33 is applied over an area other than a region for forming a coil layer 14 on the lower core layer 10 and the planarization layer 32. FIG. 16 is a partial plan view of the object shown in FIG. 15. The coil layer 14 is formed in region B, and the hatched area over the lower core layer 10 and the planarization layer 32 is covered with the resist layer 33.

As shown in FIG. 15, the resist layer 33 is formed from the face opposing a recording medium in the height direction (Y direction in the drawing) and has a length L2.

Next, the exposed region B for forming the coil layer 14 is etched away up to a predetermined depth H4, which is approximately half the thickness H9 of the original lower core layer 10.

Figure 17:
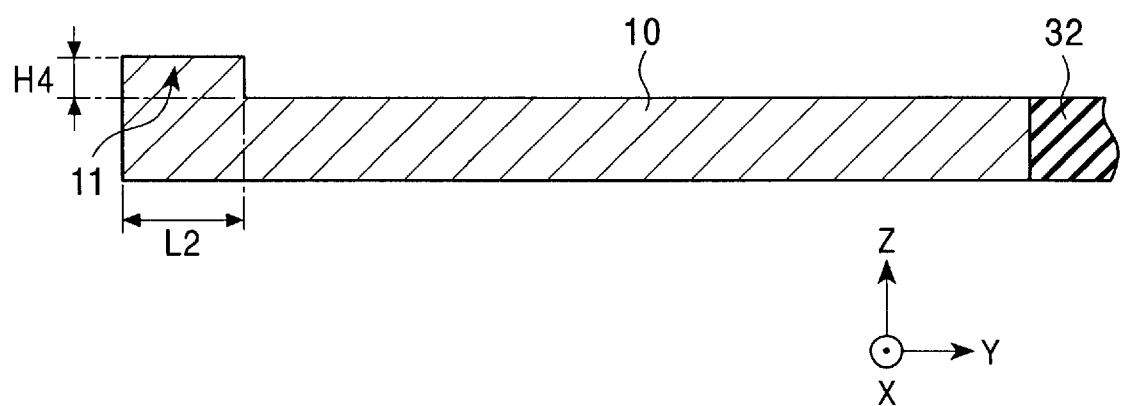
FIG. 17 is a cross-sectional view showing a step subsequent to the step shown in FIG. 15.
Figure 18:
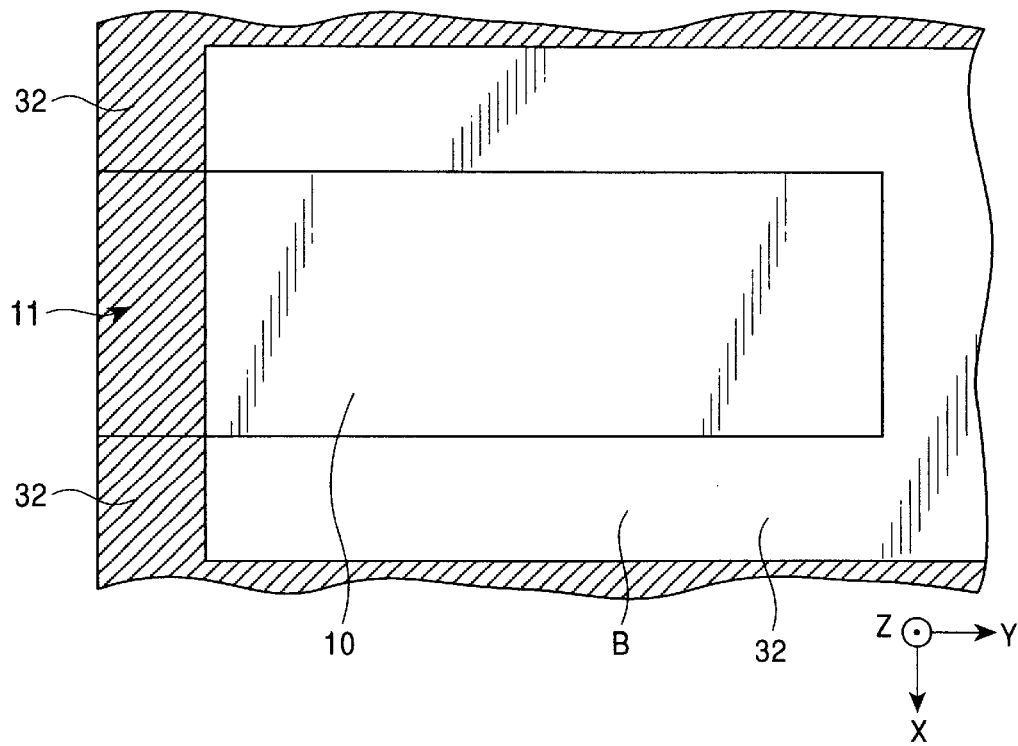
FIG. 18 is a partial front view of the thin-film magnetic head shown in FIG. 17.

FIG. 17 is a partial cross-sectional view showing the lower core layer 10 after the etching process, and FIG. 18 is a partial plan view of the object shown in FIG. 17. A protruding portion having a predetermined length L2 and a height H4 is formed from the face opposing a recording medium in the height direction on the lower core layer 10. This protruding portion corresponds to the lower magnetic pole layer 11. That is, the lower magnetic pole layer 11 and the lower core layer 10 are integrated formed in this embodiment. On the other hand, the surface of the region B for forming the coil layer 14 is etched away as shown in FIG. 18. Thus, the height of the region B is smaller than the height of the planarization layer 32 in the hatched region by H4. That is, the surface of the lower magnetic pole layer 11 protruding at the front end of the lower core layer 10 and the surfaces of the planarization layers 32 at both sides in the track width direction (X direction in the drawing) lie in the same plane. In other words, planarization surfaces, which is composed of, for example, $Al_2O_3$, and has the same height as that of the lower magnetic pole layer 11, extend at both sides in the track width direction of the lower magnetic pole layer 11.

Figure 19:
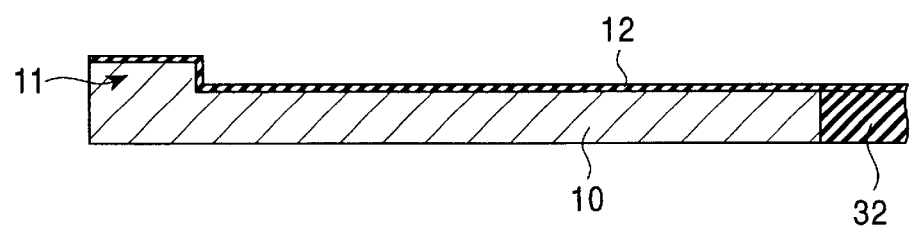
FIG. 19 is a cross-sectional view showing a step subsequent to the step shown in FIG. 17.

With reference to FIG. 19, a gap layer 12 is formed over the lower magnetic pole layer 11, the lower core layer 10, and the planarization layer 32. Next, an insulating layer 13, a coil layer 14, a coil-insulating layer 15, and an insulating layer 17 are formed in the region B shown in FIG. 18, as in the steps shown in FIGS. 10, 11, and 12.

An upper core layer 16 is formed over the gap layer 12 and the coil-insulating layer 15 by a frame plating process.

In this embodiment in which the lower magnetic pole layer 11 is formed by etching of the lower core layer 10, the front end 16a of the upper core layer 16 can be more precisely formed within a predetermined track width Tw, because the planarization surfaces having the same height as that of the lower magnetic pole layer 11 extend on both sides of the lower magnetic pole layer 11 in the track width direction.

In the formation of the upper core layer 16 by a frame plating process, a resist layer 31 is applied to an area for forming the upper core layer 16 (see FIG. 11). The shape of the front end 16a of the upper core layer 16 is patterned in the resist layer 31 formed on the lower magnetic pole layer 11. Since the front end 16a has the track width Tw, the pattern of the upper core layer 16 must be formed with high precision.

An essential requirement for improving the patterning precision is the formation of the resist layer 31 having a small and uniform thickness. The resolution is thereby improved and the effect of irregular reflection is moderated. Since the surface of the lower magnetic pole layer 11 for forming the front end 16a of the upper core layer 16 and the planarization surfaces 32 extending both sides thereof lie in the same plane, the resist layer 31 having a small and uniform thickness can be formed over the lower magnetic pole layer 11 and the planarization layers 32 at both sides thereof.

The shape of the front end 16a of the upper core layer 16 can be patterned in the resist layer 31 by exposure, and the front end 16a can be formed within a predetermined track width Tw. Accordingly, a thin-film magnetic head suitable for trends towards narrower track width can be formed.

Figure 20:
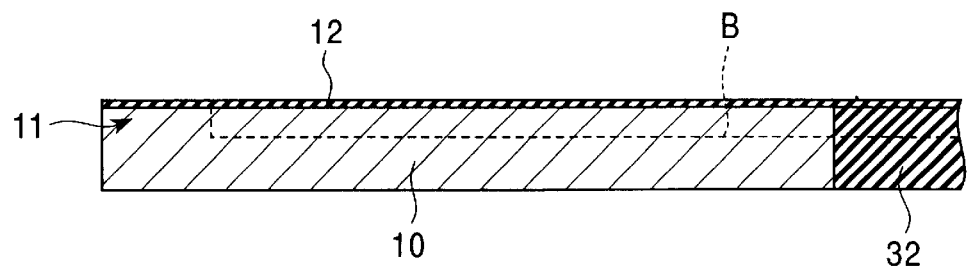
FIG. 20 is a cross-sectional view showing another step instead of the step shown in FIG. 15.

FIG. 20 shows a step for milling by, for example, etching the region B for forming the coil layer 14 on the lower core layer 10, as in the step shown in FIG. 15. In this embodiment, the lower core layer 10 and the planarization layer 32 extending in the track width direction (X direction in the drawing) and the height direction (Y direction in the drawing) are planarized by CMP or the like, and then the gap layer 12 is formed on the lower core layer 10 and the planarization layer 32. Next, the lower core layer 10 and the planarization layer 32 in the region B for forming the coil layer 14 are milled by etching or the like.

Thus, in this embodiment, the gap layer 12 is removed in the region B, but still remains on the lower magnetic pole layer 11. Next, the coil layer 14 etc. is formed. The completed thin-film magnetic head has a configuration shown in FIG. 5, that is, the gap layer 12 is formed only on the lower magnetic pole layer 11.

Figure 21:
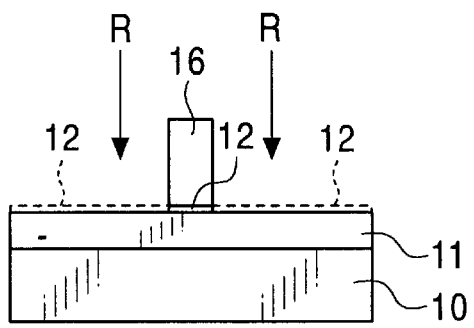
FIG. 21 is a cross-sectional view showing a step of a method for making the thin-film magnetic head shown in FIG. 6.
Figure 22:
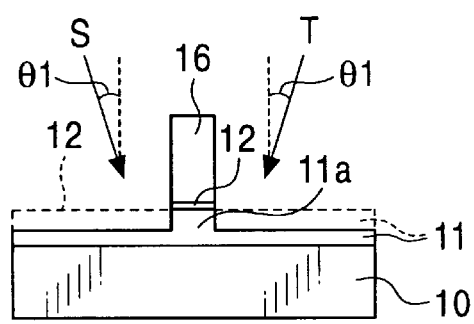
FIG. 22 is a cross-sectional view showing a step subsequent to the step shown in FIG. 21.
Figure 23:
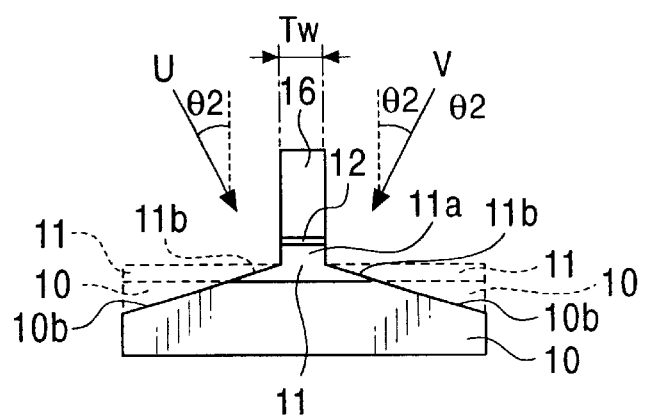
FIG. 23 is a cross-sectional view showing a step subsequent to the step shown in FIG. 22.
Figure 24:
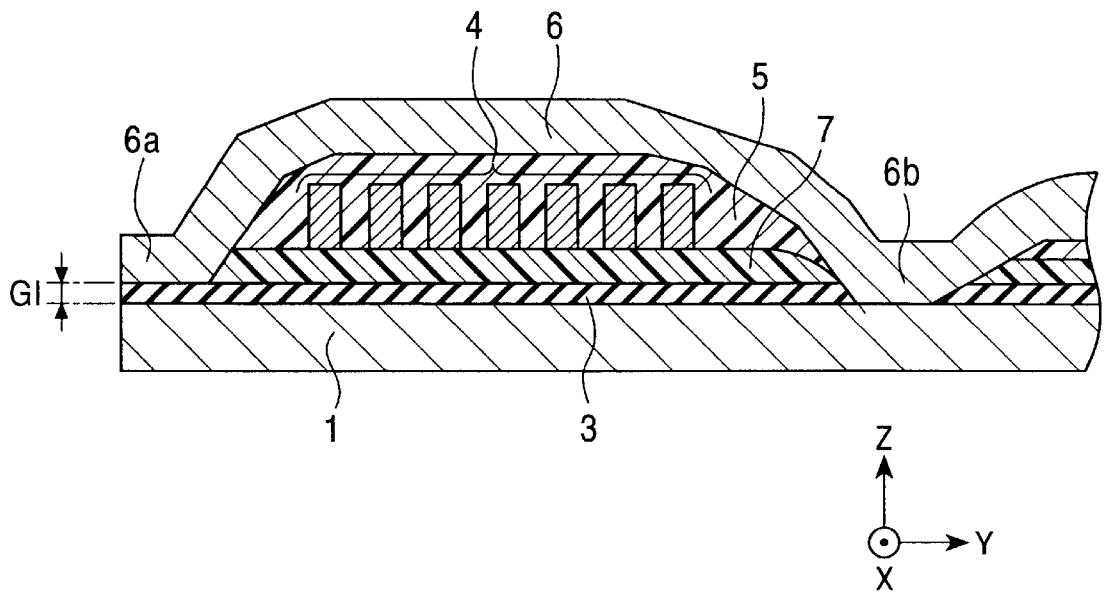
FIG. 24 is a partial longitudinal cross-sectional view showing a structure of a conventional thin-film magnetic head.

FIGS. 21 to 23 are partial front view showing the steps of forming the front profile of the thin-film magnetic head shown in FIG. 6.

With reference to FIG. 21, the gap layer 12 extending from the base end of the upper core layer 16 in the track width direction (X direction in the drawing) is removed by anisotropic etching along the direction of arrow R (vertical direction). A typical anisotropic etching process is a plasma etching process. The gap layer 12 is removed from the dotted lines shown in FIG. 21, and the remaining gap layer 12 between the upper core layer 16 and the lower magnetic pole layer 11 has the track width Tw which is the same as that of the upper core layer 16. Since the plasma etching removes the nonmagnetic material by a chemical effect, this process does not damage the lower magnetic pole layer 11 and the upper core layer 16.

At a portion in which the gap layer 12 is removed, the lower magnetic pole layer 11 is exposed.

With reference to FIG. 22, the upper surface of the lower magnetic pole layer 11 at both sides of the track width Tw is milled by primary ion milling. In the primary ion milling, ionized-neutralized argon gas, which is ionized and then partially neutralized, is used. The lower magnetic pole layer 11 is irradiated with argon ions along the directions of arrows S and T. The incident angle of the argon ions is preferably within a range of 0 to 30° C. That is, the upper face of the lower magnetic pole layer 11 is irradiated with the argon ions along the direction which is near the vertical line. During the primary ion milling, the upper portions of the lower magnetic pole layer 11 are milled at both sides of the gap layer 12 by physical effects so that the milled portions are substantially rectangular. The lower magnetic pole layer 11 has a protruding portion 11a having substantially vertical sides and having substantially the same width as that of the width (track width Tw) of the insulating layer 13.

The front shape of the protruding portion 11a varies with the incident angle θ1 of the ion beams. When the incident angle θ1 is near zero, the front shape of the protruding portion 11a is rectangular. When the ion beams have a certain incident angle θ1, the both sides of the protruding portion 11a slope and the front shape of the protruding portion 11a is trapezoidal in which the width of the bottom is larger that that of the top.

The magnetic powder formed by the primary ion milling adheres to the upper core layer 16, the gap layer 12, and the both sides of the protruding portion 11a. Since such magnetic powder causes deterioration of magnetic characteristics, the powder must be adequately removed. Thus, secondary ion milling is performed to remove the adhering magnetic powder and to form sloping faces 11b on the lower magnetic pole layer 11 which are effective for suppression of write fringing.

Also, in the secondary ion milling, ionized-neutralized argon gas is used, as in the primary ion milling. As shown in FIG. 23, in the secondary ion milling, ion beams enter along arrows U and V. The incident angle of the ion beam θ2 is preferably within a range of 45° to 70°. That is, in the secondary ion milling, ion beams enter more obliquely compared to the first ion milling (the incident angle θ1 is in a range of 0° to 30°).

During the secondary ion milling, the upper portions of the lower magnetic pole layer 11 extending from the bottom corners of the protruding portion 11a in the track width direction are obliquely milled to form sloping faces 11b on the lower magnetic pole layer 11. The upper faces of the lower core layer 10 are simultaneously milled during the secondary ion milling to form sloping faces 10b continuing from the sloping faces 11b.

In the secondary ion milling, the magnetic powder adhering to the upper core layer 16, the gap layer 12, and the both sides of the protruding portion 11a is also removed. Thus, magnetic short-circuiting between the insulating layer 13 and the lower magnetic pole layer 11 does not occur.

In this embodiment, both sides of the upper core layer 16 are also milled during the primary ion milling and the secondary ion milling. As a result, the track width Tw defined by the width of the upper core layer 16 is further decreased. The resulting thin-film magnetic head is suitable for future trends toward narrower track widths which are required for higher-recording densities. In the present invention, the track width Tw is preferably formed within a range of 0.5 μm to 1.5 μm.

The front shapes of the thin-film magnetic heads shown in FIGS. 7 and 8 are formed by appropriately determining the times and the incident angles of the primary ion milling and the secondary ion milling.

In the formation of the front shape of the thin-film magnetic head shown in FIG. 7, the angle θ2 of the incident ion beams in the secondary ion milling is set to be higher than that in the step shown in FIG. 23 so as to form sloping faces 11b on the lower magnetic pole layer 11 but so as not to sloping faces on the lower core layer 10.

In the formation of the front shape of the thin-film magnetic head shown in FIG. 8, the milling time in the primary ion milling is prolonged to completely remove two side portions of the lower magnetic pole layer 11 extending from bottom corners of the gap layer 12 so that the width of the junction between the lower magnetic pole layer 11 and the gap layer 12 is equal to the track width Tw and that the lower magnetic pole layer 11 is rectangular or trapezoidal at the face opposing a recording medium. In the trapezoidal shape, the bottom width of the lower magnetic pole layer 11 in contact with the gap layer 12 is larger than the top width in contact with the gap layer 12. The prolonged milling time forms a protruding portion 10a of the lower core layer 10 at the junction with the lower magnetic pole layer 11 and the protruding portion 10a has the same thickness as that of the bottom of the lower magnetic pole layer 11.

In the subsequent secondary ion milling, sloping faces 10b extending from the bottom corners of the protruding portion 10a are formed on upper faces of the lower core layer 10, and the sloping faces 10b slope so as to depart from the upper core layer 16.

In the above process, the lower magnetic pole layer 11 are integrally formed with and protrude from the lower core layer 10, and the sloping faces 10b departing from the both bottom corners of the lower magnetic pole layer 11 in the track width direction are formed on the lower core layer 10.

As described above, the primary and secondary ion milling steps facilitate the production of a thin-film magnetic head suitable for a narrower track width. Moreover, the sloping faces 11b of the lower magnetic pole layer 11 and the sloping faces 10b of the protruding portion 10a contribute to an adequate reduction in write fringing.

What is claimed is:

1. A thin-film magnetic head comprising:

a lower core layer;

a lower magnetic pole layer formed separately on the lower core layer, the lower magnetic pole layer extending from a face opposing a recording medium by a predetermined length in a height direction, a back end of the lower magnetic pole layer forming a step on an upper face of the lower core layer;

a nonmagnetic gap layer extending from a face opposing the recording medium on the lower magnetic pole layer;

an upper core layer in contact with the upper face of the gap layer; and a coil layer lying behind the back end of the lower magnetic pole layer in the height direction, the coil layer being covered with a coil-insulating layer and inducing a recording magnetic field in the lower core layer and the upper core layer;

wherein the upper core layer in contact with the gap layer has a track width Tw at an exposed face opposing a recording medium, and the upper core layer extends on the coil-insulating layer, wherein the gap layer has the track width Tw, and the lower magnetic pole layer has the track width Tw at a position in contact with the gap layer, wherein the lower magnetic pole layer is formed independently of the lower core layer and has a base portion and a protruding portion extending toward the upper core layer, the width of the protruding portion is smaller than that of the base portion, and the upper face of the protruding portion is in contact with the gap layer, wherein the lower magnetic pole layer has sloping faces extending from the bottom corners of the protruding portion toward directions departing from the upper core layer at both sides in the track width direction, and wherein the lower core layer has sloping upper faces continuing from the sloping faces of the lower magnetic pole layer.

2. A thin-film magnetic head comprising:

a lower core layer;

a lower magnetic pole layer formed separately on the lower core layer, the lower magnetic pole layer extending from a face opposing a recording medium by a predetermined length in a height direction, a back end of the lower magnetic pole layer forming a step on an upper face of the lower core layer;

a nonmagnetic gap layer extending from a face opposing the recording medium on the lower magnetic pole layer;

an upper core layer in contact with the upper face of the gap layer;

a coil layer lying behind the back end of the lower magnetic pole layer in the height direction, the coil layer being covered with a coil-insulating layer and inducing a recording magnetic field in the lower core layer and the upper core layer; and a gap-depth-defining insulating layer provided on the lower magnetic pole layer and extending from a position which is distant from a face opposing a recording medium by a predetermined distance in the height direction, wherein the upper core layer in contact with the gap layer has a track width Tw at an exposed face opposing a recording medium, and the upper core layer extends on the coil-insulating layer.

3. A thin-film magnetic head according to claim 2, wherein the gap-distance-defining insulating layer comprises an organic insulating material.

4. A thin-film magnetic head according to claim 2, wherein the lower magnetic pole layer has a predetermined length from the face opposing the recording medium in the height direction, the predetermined length being larger than a gap depth from the face opposing the recording medium to the front end of an insulating layer in the height direction.

5. A thin-film magnetic head comprising:

a lower core layer;

a lower magnetic pole layer formed separately on the lower core layer, the lower magnetic pole layer extending from a face opposing a recording medium by a predetermined length in a height direction, a back end of the lower magnetic pole layer forming a step on an upper face of the lower core layer;

a nonmagnetic gap layer extending from a face opposing the recording medium on the lower magnetic pole layer;

an upper core layer in contact with the upper face of the gap layer;

a coil layer lying behind the back end of the lower magnetic pole layer in the height direction, the coil layer being covered with a coil-insulating layer and inducing a recording magnetic field in the lower core layer and the upper core layer; and a gap-depth-defining insulating layer extending from a position distant from a face opposing a recording medium by a predetermined distance in the height direction, wherein the gap-defining insulating layer and an insulating layer lying between the coil layer and the lower core layer are integrally formed, wherein the upper core layer in contact with the gap layer has a track width Tw at an exposed face opposing a recording medium, and the upper core layer extends on the coil-insulating layer.

6. A thin-film magnetic head according to claim 5, wherein the lower magnetic pole layer has a predetermined length from the face opposing the recording medium in the height direction, the predetermined length being larger than a gap depth from the face opposing the recording medium to the front end of an insulating layer in the height direction.

7. A thin-film magnetic head comprising:

a lower core layer;

a lower magnetic pole layer formed integrally with an upper face of the lower core layer, the lower magnetic pole layer extending from a face opposing a recording medium by a predetermined length in a height direction, a back end of the lower magnetic pole layer forming a step on the upper face of the lower core layer;

a nonmagnetic gap layer extending from a face opposing the recording medium on the lower magnetic pole layer;

an upper core layer in contact with the upper face of the gap layer;

a coil layer lying behind the back end of the lower magnetic pole layer in the height direction, the coil layer being covered with a coil-insulating layer and inducing a recording magnetic field in the lower core layer and the upper core layer; and a gap-depth-defining insulating layer provided on the lower magnetic pole layer and extending from a position which is distant from a face opposing a recording medium by a predetermined distance in the height direction, wherein the upper core layer in contact with the gap layer has a track width Tw at an exposed face opposing a recording medium, and the upper core layer extends on the coil-insulating layer.

8. A thin-film magnetic head according to claim 7, wherein the gap-distance-defining insulating layer comprises an organic insulating material.

9. A thin-film magnetic head according to claim 7, wherein the lower magnetic pole layer has a predetermined length from the face opposing the recording medium in the height direction, the predetermined length being larger than a gap depth from the face opposing the recording medium to the front end of an insulating layer in the height direction.

10. A thin-film magnetic head comprising:

a lower core layer;

a lower magnetic pole layer formed integrally with an upper face of the lower core layer, the lower magnetic pole layer extending from a face opposing a recording medium by a predetermined length in a height direction, a back end of the lower magnetic pole layer forming a step on the upper face of the lower core layer;

a nonmagnetic gap layer extending from a face opposing the recording medium on the lower magnetic pole layer;

an upper core layer in contact with the upper face of the gap layer;

a coil layer lying behind the back end of the lower magnetic pole layer in the height direction, the coil layer being covered with a coil-insulating layer and inducing a recording magnetic field in the lower core layer and the upper core layer; and a gap-depth-defining insulating layer extending from a position distant from a face opposing a recording medium by a predetermined distance in the height direction, wherein the gap-defining insulating layer and an insulating layer lying between the coil layer and the lower core layer are integrally formed, and wherein the upper core layer in contact with the gap layer has a track width Tw at an exposed face opposing a recording medium, and the upper core layer extends on the coil-insulating layer.

11. A thin-film magnetic head according to claim 10, wherein the lower magnetic pole layer has a predetermined length from the face opposing the recording medium in the height direction, the predetermined length being larger than a gap depth from the face opposing the recording medium to the front end of an insulating layer in the height direction.

12. A thin-film magnetic head comprising:

a lower core layer;

a lower magnetic pole layer formed separately on the lower core layer, the lower magnetic pole layer extending from a face opposing a recording medium by a predetermined length in a height direction, a back end of the lower magnetic pole layer forming a step on an upper face of the lower core layer;

a nonmagnetic gap layer extending from a face opposing the recording medium on the lower magnetic pole layer;

an upper core layer in contact with the upper face of the gap layer; and a coil layer lying behind the back end of the lower magnetic pole layer in the height direction, the coil layer being covered with a coil-insulating layer and inducing a recording magnetic field in the lower core layer and the upper core layer;

wherein the upper core layer in contact with the gap layer has a track width Tw at an exposed face opposing a recording medium, and the upper core layer extends on the coil-insulating layer, wherein the gap layer has the track width Tw, and the lower magnetic pole layer has the track width Tw at a position in contact with the gap layer, wherein the lower magnetic pole layer is formed independently of the lower core layer and is rectangularly or trapezoidally shaped as viewed from the exposed face and in which the lower core layer has upper faces sloping away from and in directions departing from the lower magnetic pole layer at both sides in the track width direction.

* * * * *